Sept. 6, 1966     E. WIEDEMANN     3,271,603
DEVICE FOR TRANSMITTING ELECTRICAL CURRENTS
Filed Dec. 30, 1963     2 Sheets-Sheet 1

Inventor
Eugen Wiedemann
By Pierce, Scheffler & Parker
Attorneys

United States Patent Office 3,271,603
Patented Sept. 6, 1966

3,271,603
DEVICE FOR TRANSMITTING ELECTRICAL CURRENTS
Eugen Wiedemann, Baden, Switzerland, assignor to Aktiengesellschaft Brown, Boveri & Cie., Baden, Switzerland, a joint-stock company
Filed Dec. 30, 1963, Ser. No. 334,444
Claims priority, application Switzerland, Jan. 7, 1963, 134/63
8 Claims. (Cl. 310—219)

The present invention concerns a device for transmitting electrical currents from stationary to rotating parts.

The conventional method of transmitting current from stationary to rotating machine elements in electrical machines is by means of carbon brushes and slip rings. This method, particularly in the case of large currents, has however several disadvantages. Due to the low specific current load which the brushes can carry, the brush gear becomes very voluminous so that a large number of individual carbon brushes have to be connected in parallel in one current branch. The difficulty as regards obtaining the necessary space for the brush gear and the problem of a uniform current distribution amongst the individual brushes is a well known fact. A still greater disadvantage is that at high peripheral speeds the wear of the brushes is considerable and necessitates a periodical replacement of the brush sets.

In order to overcome these difficulties with high currents, various solutions of a constructional nature are known where liquid metals such as mercury or sodium alloys serve to transmit the current between the stationary and rotating part.

The inventive idea of the present patent application goes another way.

The device according to the invention is characterized by the feature that electrically conductive solid matter divided into fine pourable particles serves as the transmission medium between the parts, and that between the contact points of the parts a channel is provided for guiding the solid matter.

Constructional examples of the invention are explained by means of the accompanying drawings.

Figure 1:
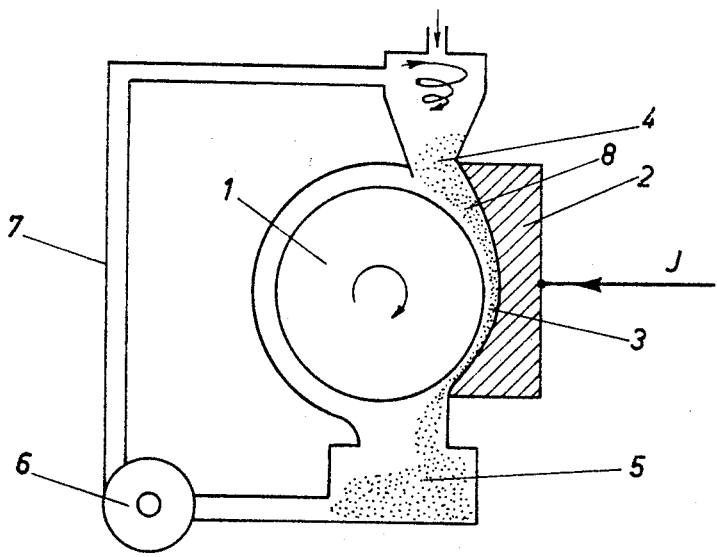
Figure 2:
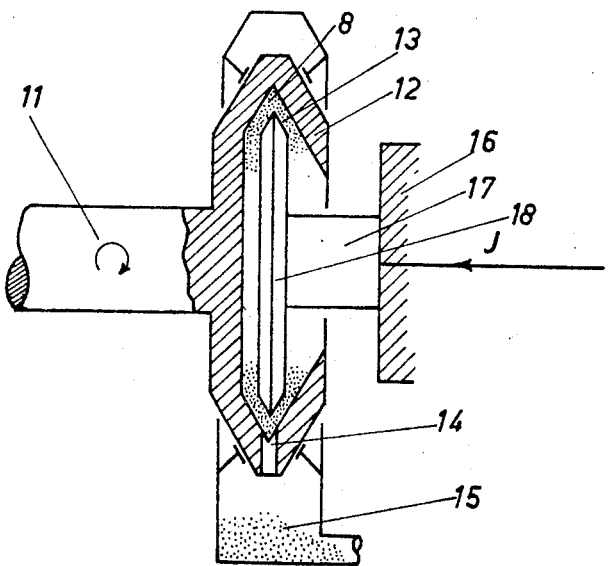
Figure 3:
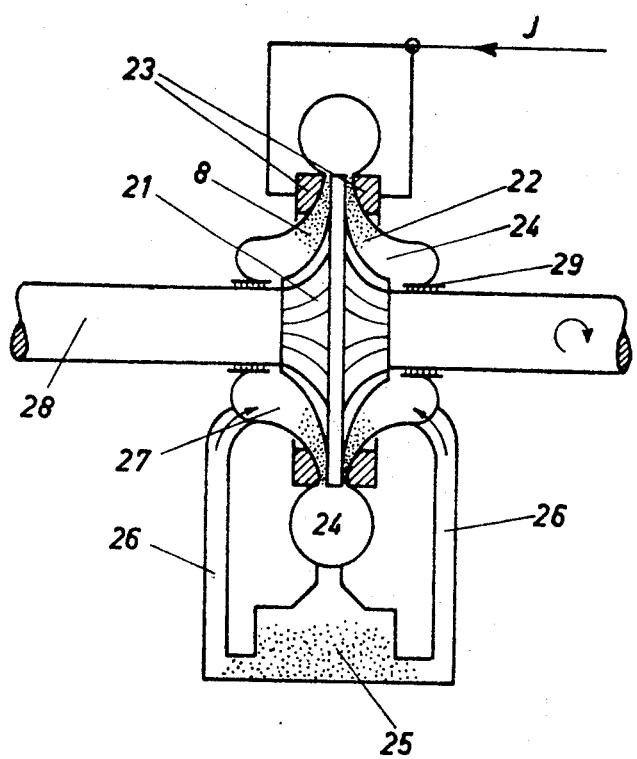

FIG. 1 shows a cross-sectional schematic view of a device for transmitting electric currents from stationary to rotating parts, FIG. 2 an axial section through an arrangement similar to that of FIG. 1, FIG. 3 a further modified constructional form of a device analogous to that shown in FIG. 2.

In FIG. 1 reference numeral 1 indicates the contact disk of a rotor, for instance belonging to an electric motor, which is supported in a casing which also serves to accommodate a stationary contact shoe 2. Between the contact disk 1 and the contact shoe 2 there is a guide channel 3, visible in the drawing, which at its upper end is joined to a supply funnel 4 connected to an inert gas source and at its lower end is joined to a collecting receiver 5. A pipe 7 in the form of a pneumatic closed pipeline connects the receiver 5 by way of a conveyor fan 6 to the upper part of the supply funnel 4.

An electrically conductive powder 8, for instance graphite powder, circulates in this closed system. The stationary contact shoe 2 is connected by means of a conductor J to a source of current (not shown). When in service, current is transmitted from the stationary shoe 2 by way of the electrically conductive powder 8 in the guide channel 3 to the contact disk 1 of the motor rotor.

Due to the cyclone effect of the fan 6 and the adhesive frictional effect of the contact disk 1, the electrically conductive powder 8 is pressed through the guide channel 3, which is in the form of a gap that becomes narrower towards the outlet, so that at the current transition points the current is conducted by the slightly compressed powder. The large cross-sectional areas available for the current transmission enable very high currents to be transmitted.

Since the guide channel or gap 3 communicates with the receiver 5, a certain amount of the powder 8 continuously passes from the gap 3 into the receiver 5 where it collects and is conveyed by the fan 6 through the pipe 7 back to the funnel 4 from where it passes down into the gap 3 again.

This system enables a continuous operation to be achieved, whereby the receiver 5 can be so constructed that the graphite powder can be replaced or fresh powder added without any interruption occurring.

With the constructional form shown in FIG. 2 a contact casing 12 is mounted on a rotor shaft 11, a stationary contact disk 18 being located inside this casing. This contact disk is joined to a stator casing 16 by means of a pin 17. Between the contact casing 12 and the stationary contact disk 18 is a guide channel 13 in which there is solid matter in powder form 8, for instance graphite powder. The contact casing 12 is provided with a number of centrifugal channels 14, evenly distributed around the circumference, which communicate with an annular receiver 15. A pipe connects the receiver 15 with a regenerating and supply station (not shown in the drawing) from which the powder passes back again into the contact casing.

The stator part 16 is provided with a current terminal J. When in operation, current flows through the stator 16 and pin 17 to the stationary contact disk 18 and then by way of the electrically conductive powder 8 in the guide channel 13 to the contact casing 12 and from there to the rotor winding. When the shaft 11 rotates, the centrifugal force causes the powder 8 to be compressed in the guide channel 13, so that the current transmission from the contact disk 18 to the contact casing 12 is improved. At the same time the centrifugal force ensures that graphite powder is forced continuously outwards through the centrifugal channels 14 into the collecting receiver 15 whereupon it passes to the regenerating plant which supplies fresh and regenerated powder to the contact casing 12. In this way the electrically conductive powder is renewed sufficiently so that good current conduction is guaranteed even with very high currents.

Another constructional form is illustrated in FIG. 3 which shows a centrifugal contact disk 21 provided with guide slots and mounted on a rotor shaft 28. Stationary contact rings 23 are provided on both sides of the contact disk 21, these rings being connected to a current supply conductor J. Between the rotor shaft 28 and the contact rings 23 for the current supply a powder collecting and supply channel 24 is visible which is sealed off from the shaft 28 by means of labyrinth glands 29. The part of the channel 24 through which the powder is forced out is joined to a powder treating or regenerating plant 25 from where it is conveyed, for instance pneumatically by means of injectors, through the pipes 26 back to the supply part 27 of channel 24.

Also with this constructional example, there is, between the current conductive contact rings 23 and the contact disk 21, a gap which becomes narrower in the outward direction and where due to the guide slots in the centrifugal contact disk the powder is compressed so that better current transmission is assured. Around the entire periphery of the disk, a certain amount of powder always passes into the collecting part of the channel 24 from where it subsequently flows to the powder regenerating plant. Here it is regenerated and when necessary fresh powder is added, whereupon the mixture is blown through the pipes 26 to the supply part 27 and then into the annular gap 22 where it serves to transmit the electrical current from the contact rings 23 to the contact disk 21. The rotating contact disk 21 serves not only to compress the electrically conductive powder, particularly graphite powder, but also conveys it in such a manner that it moves continuously along a circular path whereby it is cooled and regenerated.

Besides graphite powder, it is also possible to use as electrically conductive solid matter in a pourable state graphite-amorphous carbon mixtures or graphite with metallic powder additives, such as are used for making metallic graphite brushes. It is also an advantage to add to the current-conductive powder further materials in powder, paste or liquid form, such as for instance molybdic sulphide or special oils, which favourably affect the friction oxidation, and current transmission conditions.

I claim:

1. A device for transmitting electrical currents from stationary to rotating parts, characterized in that an electrically conductive solid matter finely divided into a pourable state serves as the transmission medium and that between the contact points of said parts a channel for guiding the conductive matter is provided.

2. A device as in claim 1, characterized in that the channel between the stationary and rotating part is arranged in such a manner, that the solid matter at the contact point is compressed by the centrifugal effect.

3. A device as in claim 1, characterized in that the solid matter is in powder form.

4. A device as in claim 1, characterized in that a connection for supplying an inert gas is provided to prevent oxidation and ageing of the current conductive solid matter.

5. A device as in claim 1, characterized by a closed circuit for the current-conductive solid matter and conveyor and regenerating means located in said circuit.

6. A device as in claim 1, characterized in that graphite powder is used as the solid matter.

7. A device as in claim 1, characterized in that a further material is added to the current conductive solid matter to improve the frictional, oxidation, and current-transmission properties of the solid matter.

8. A device as in claim 7, characterized in that the added material is in solid, paste or liquid form.

References Cited by the Examiner

UNITED STATES PATENTS 511,328   12/1893   Emery _____ 310—219

FOREIGN PATENTS 1,094,354   12/1960   Germany.

MILTON D. HIRSHFIELD, *Primary Examiner.*

D. F. DUGGAN, *Assistant Examiner.*